2 Sheets—Sheet 1.
S. M. FEEZLER.
COMBINED THRASHER AND CLOVER-HULLER.
No. 174,727. Patented March 14, 1876.
FIG. I.
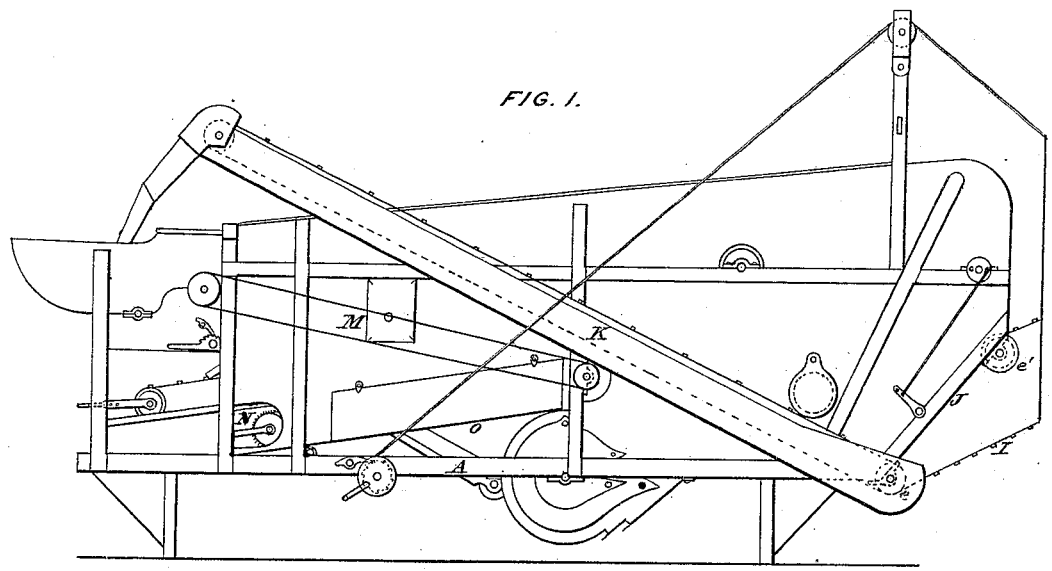
FIG. II.
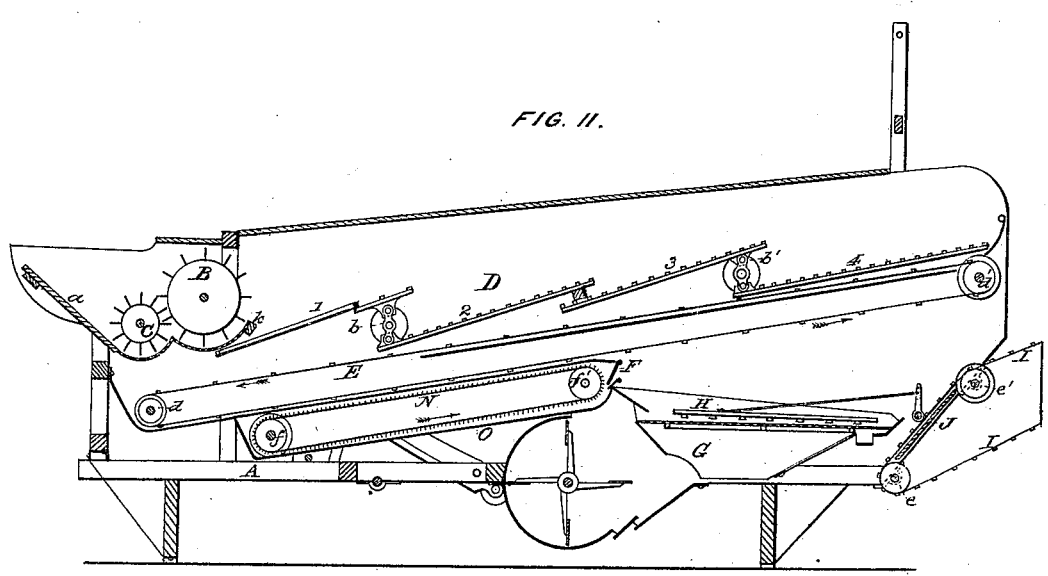
WITNESSES:
Charles Ketchum.
John L. Lewis.
INVENTOR
Stephen M. Feezler

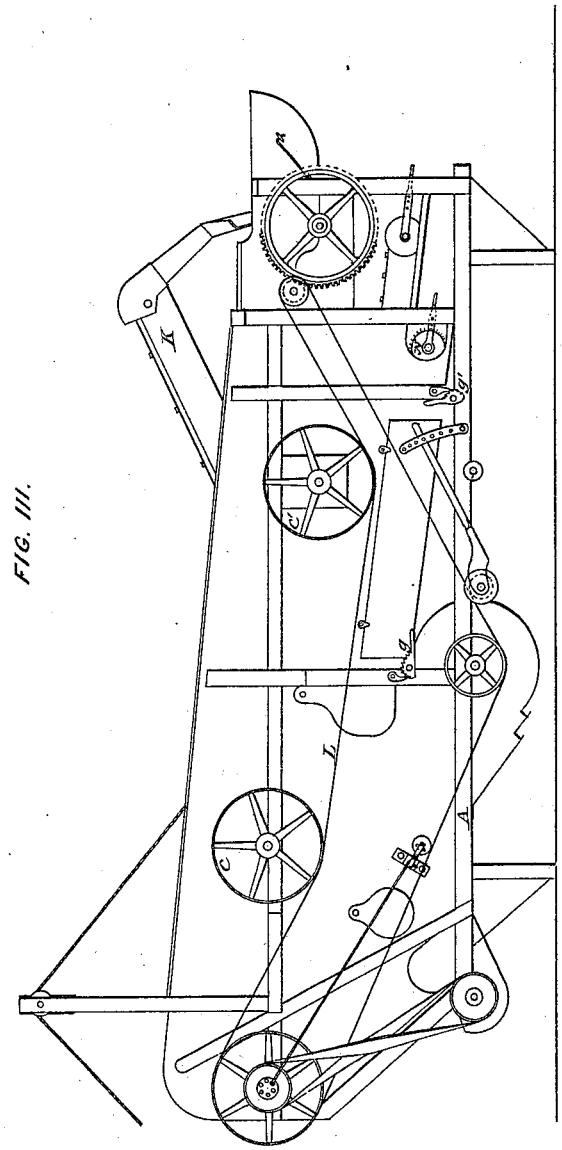

UNITED STATES PATENT OFFICE.

STEPHEN M. FEEZLER, OF CANOGA, NEW YORK.

IMPROVEMENT IN COMBINED THRASHERS AND CLOVER-HULLERS.

Specification forming part of Letters Patent No. 174,727, dated March 14, 1876; application filed June 15, 1874.

*To all whom it may concern:*

Be it known that I, STEPHEN M. FEEZLER, of Canoga, in the county of Seneca and State of New York, have invented a Thrashing, Hulling, and Separating Machine, of which the following is a specification:

The object of my invention is to thrash and clean grain of all kinds, separate the grain from the straw and winnow the grain; and thrash and hull clover and other seeds, and separate the seed from the straw or stalks and winnow it.

Thrashing is performed by two thrashing-cylinders—one larger than the other—both having teeth alike. Neither one has a toothed concave like ordinary thrashers. The small cylinder may be removed when thrashing bolls of seed from the straw or stalk. From the cylinders the straw is thrown on a separator constructed with lattice-work that will allow the grain to fall through it, and made in sections and operated on ways by cranks, so that the separator will separate the grain or seed from the straw or stalks and carry the straw out of the machine.

The huller consists of an endless belt provided with sharp teeth on the outside. The belt is carried around two rollers that support and move it. Beneath the belt is an inclined table or bed that has on its upper surface sharp teeth that aid in hulling the seed from the bolls, while the belt moves the bolls along over the bed, and from this bed the hulled seed is conveyed into the winnower by a slatted belt that carries the bolls or grain to the winnower.

The machine is illustrated more in detail in the side elevations, Figures 1 and 3. Fig. 2 is a longitudinal vertical section.

A is the frame-work that contains and supports the various parts of the machinery. It is made the ordinary size, and arranged to be carried and used on a wagon, and the parts are arranged to receive and support the various parts that may be put into or attached to it. B is the thrashing-cylinder. It may be constructed in any ordinary manner. Its shaft is long enough to apply the necessary pulleys and wheels to give motion to the other machinery. It is provided with a concave beneath it, made without teeth, and open so that the thrashed grain or seed may fall through it, and at the end where the grain and straw is discharged is a rib or bar, -k, to prevent too free discharge, and to prevent the grain and straw being thrown too far on the separator. The concave may be adjusted in any ordinary manner. C is an auxiliary cylinder. It may be made similar to the other cylinder B, but not so large, and it is provided with the same kind of teeth. It is made so that the shaft may be withdrawn from it, and the cylinder taken out from the machine when it is not needed in thrashing bolls from the stalk of clover-seed. It shaft has a cog-wheel fastened to it that gears into a pinion on the shaft of the cylinder B, and is by it driven. The size of the wheel and pinion is such as to give a slower motion to the cylinder C. The cylinders are placed so near together that the teeth of one will nearly touch the other, but are so set that they will pass each other without touching. The cylinder C is also provided with an open concave without teeth. An apron or chute, *a*, conveys the unthrashed grain to the cylinder C, and when this cylinder is taken out the apron may be raised up to the other concave. D is the separator of the grain or seed from the straw or stalks. It is made in sections 1, 2, 3, and 4, of lattice-work, with proper spaces to let the grain fall through. One end of each section has a journal-bearing fastened to each side of one end, so that it may be coupled with the double cranks *b* and *b'* that actuate them. The other ends are placed on supports so that they may freely slide to and fro. Their position is clearly shown in the sectional figure. The double cranks are driven by the band-wheels *c* and *c'*. The open endless belt E on rollers *d d'* conveys the grain to the winnower, or bolls to the huller, as it moves in the direction indicated by the arrows, and by its motion carries the grain along upon the platforms underneath the parts to the winnower, or seed to the huller. F is a chute that directs the falling grain or seed into the huller or winnower. It is made of two pieces of nearly equal width hinged together and pivoted or hinged to the end of the huller-bottom, so that it may be turned over the opening into the huller, or turned to close the opening, and direct the grain into the winnower, as shown in sectional Fig. 2. G is the winnower. It may be constructed in any ordinary manner. It is provided with a cleaner, H, that is used to keep the straws off the sieves and convey them off among the chaff. It is made by fastening slats across a piece of timber, and the whole is actuated by a connection from the shaft of the roller $d'$ that rocks a rod extending across the machine, having a crank near the middle that will move the cleaner to and fro. I is the slatted belt of the straw-carrier. It passes around the rollers $e$ and $e'$, to give it an upward motion to take the chaff from the winnower and to receive the straw from the separator without its falling so far that it may be blown off the carrier. The straw-carrier may be constructed and supported in any ordinary manner. J is an apron made of boards, and large enough to cover the space between the rollers $e$ and $e'$ to be put in place when the chaff is to be carried off with the straw, and taken off when the chaff is to be kept from the straw. K is an elevator, used to convey tailings up to the cylinder. L is the band that transmits motion from the cylinder-shaft to the various parts of the machine; its position is shown in Fig. 3. M is a band that runs the huller, and its place is shown in Fig. 1. N is the endless band of the seed-huller. It may be made of leather or other material that will hold small nails or wire teeth projecting from the outer surface for the purpose of scratching the hulls off from the seed. It is made to surround the two rollers $f$ and $f'$, and by them it is carried in the direction of the arrows in Fig. 2. The journal-boxes of the roller $f$ are made so that they may be used to draw the band tight if it stretches. They are shown in Figs. 1 and 3.

$o$ is the platform underneath the band N. It is made a little wider than the band, with ribs raised at the sides that hold the seed from getting off at the sides. Its length should be a little more than the distance of the rollers apart, and one end turned up, all as shown in Fig. 2. The upper surface may be provided with fine teeth, or roughened by corrugating metal and fastening it upon the surface or any other manner that will impede the progress of the seed through, so that the band may thoroughly hull the seed. This bed or platform is supported on cranks or cams, so that it may be raised or lowered at will, according to the different varieties and conditions of seed. At the end of the cam-rods that support it are ratchets $g$ and $g'$, each having a pawl, so that the cams may be turned to raise either or both ends of the platform at will. The ratchets are shown in Fig. 3.

I claim as my invention—

1. The separator D, made in successive sections, the adjacent ends of each pair being connected and actuated by the double cranks $b\ b'$, and the opposite ends placed on ways or supports which will allow them to slide to and fro, substantially as specified.

2. The toothed endless hulling-belt N, carried upon the rollers $f\ f$, and constructed and operating substantially as and for the purpose set forth.

3. The combination, with the toothed endless hulling-belt N, of adjustable platform $o$, having its upper surface roughened, substantially as and for the purpose set forth.

STEPHEN M. FEEZLER.

Witnesses:
 CHARLES KETCHUM,
 JOHN L. LEWIS.